UNITED STATES PATENT OFFICE 2,302,636

CYCLIC ACETALS OF KETOSTEROIDS AND A METHOD OF MAKING THE SAME

Heinrich Köster, Berlin-Charlottenburg, and Hans Herloff Inhoffen, Berlin-Wilmersdorf, Germany, assignors to Schering Corporation, Bloomfield, N. J., a corporation of New Jersey No Drawing. Application December 8, 1939, Serial No. 308,206. In Germany December 14, 1938

19 Claims. (Cl. 260—338)

This invention relates to cyclic acetals of ketosteroids and a method for making the same.

In U. S. application Serial No. 233,346, among other matters, a process for the preparation of 3-acetals of androstendiones and androstandiones is described which is characterized by treating androstendione or androstandione with acetalizing agents. As suitable agents there are mentioned especially ortho formic acid esters and other acetalizing agents, especially ketone acetals which may act in the presence of a catalyst.

Now, we have found that the manufacture of cyclic acetals of 3-ketosteroids may be effected in a very simple and efficient manner according to the present invention by using as acetalizing agents polyvalent alcohols or the corresponding alkylene oxides, suitably in the presence of acid catalysts. When using said alcohols it is necessary to remove the water formed during the reaction from the reaction mixture.

According to our process, cyclic acetals of saturated and unsaturated ketosteroids are obtainable, e. g. from androstendione, androstandione, testosterone and alkylated testosterones, progresterone and the like. Polycarbonylic compounds such as androstendione may be converted partly as well as completely into cyclic acetals, i. e. into mono- as well as polyacetals. A further advantage of the process of this invention is the fact that the yield of cyclic acetals is better than the yield obtained when using other acetalizing agents. The products obtained exhibit the same biological effects as the ketosteroids used as starting material but in a more protracted manner, so that the physiological effects can be observed over a longer period of time.

The invention may be illustrated by the following examples without, however, limiting the same to them.

Example 1

7.7 gs. of cholestenone are dissolved in 50 ccs. of benzene. Then 1.4 gs. of ethylene glycol and a few crystals of p-toluene sulfonic acid are added. In a distillation apparatus the water formed during the reaction is distilled off together with the benzene thus forming an azeotropic mixture, whereby the distillate freed from the water is caused to flow back into the reaction mixture. After distillation for 2 hours alcoholic sodium hydroxide and subsequently water are added to the mixture and the whole is extracted with ether. The oil remaining on evaporation of the dried ethereal extract solidifies to crystals on triturating with alcohol containing pyridine. The ethylene ketal of cholestenone obtained thereby shows a melting point of 132° C. and an optical rotation of $(\alpha)^{20}_D = -11.4°$ (in dioxane). Apart from the analytical data, the absence of any absorption in the ultraviolet range of the spectrum proves that the new compound has the structure of a true ethylene ketal of the following structural formula:

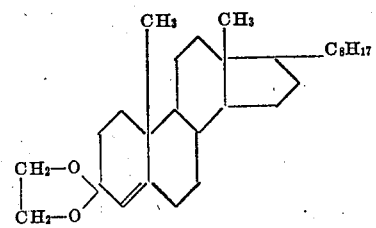

Example 2

In the manner described in Example 1, 2.9 gs. of androstendione, 0.7 g. of ethylene glycol, 50 ccs. of benzene and a few crystals of p-toluene sulfonic acid are reacted. The water formed on reaction is removed by distillation for 20 hours. On working up the reaction mixture white crystals of the ethylene ketal of androstendione are obtained, which after recrystallisation from alcohol containing pyridine shows a melting point of 199° C., an optical rotation of $(\alpha)^{20}_D = +26°$ in dioxane, no absorption band in the ultraviolet range of the spectrum, and corresponds to the following structural formula:

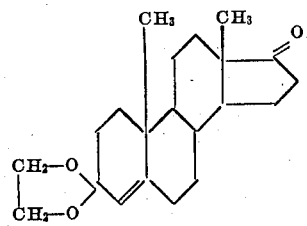

Example 3

2.9 gs. of androstendione, 1.3 gs. of ethylene glycol, 60 ccs. of benzene, and a few crystals of p-toluene sulfonic acid are treated for 23 hours according to the manner described in Example 1. Thereby crystals are obtained having a melting point of 165° C., an optical rotation of $(\alpha)^{20}_D = -51.7°$ in dioxane, no absorption band in the ultraviolet range of the spectrum, their composition corresponding to the following structural formula:

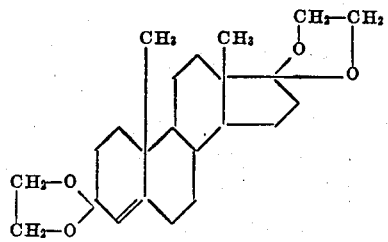

Example 4

Into a solution of 2 gs. of androstendione-3,17 in 20 ccs. of anhydrous carbon tetrachloride, to which solution a few drops of a stannic tetrachloride solution in carbon tetrachloride are added, an excess of ethylene oxide is introduced at a temperature of 30° C. After one hour the carbon tetrachloride solution is shaken with a diluted alkali solution, washed with water to neutral reaction, dried and evaporated. The residue is recrystallized from alcohol containing pyridine and yields the ethylene glycol diacetal of androstendione-3,17, as obtained according to Example 3.

Example 5

2 gs. of testosterone are dissolved in 60 ccs. of benzene. After addition of 0.5 g. of ethylene glycol and of some crystals of p-toluene sulfonic acid the mixture is distilled. Thereby the benzene portion of the distillate freed from the water formed during reaction flows continuously back into the reaction mixture. After allowing the mixture to react for 18 hours the solvent is distilled off in vacuo and the residue recrystallized from methanol containing pyridine. The ethylene glycol acetal of testosterone thus obtained has a melting point of about 181° C., shows no absorption band in the ultraviolet range of the spectrum and corresponds to the following structural formula:

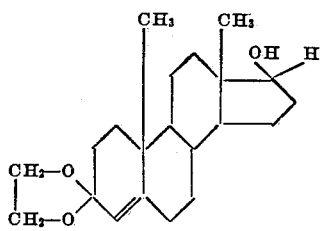

This substance exhibits a favourable physiological action in the capon-comb test. While 100 γ of testosterone injected to a capon intramuscularly show effects lasting for 8 days, the action of the equal dose of the ketal lasted for 37 days.

Example 6

3.44 gs. of testosterone propionate, 0.8 g. of propandiol-1,3, and 10 mgs. of p-toluene sulfonic acid are boiled in 70 ccs. of benzene for 17 hours, whereby the water formed during reaction is distilled off in the form of an azeotropic mixture with benzene. Thereby the benzene freed from the water is caused to flow back continuously into the reaction mixture. Then the solvent is removed by distillation in vacuo and the residue recrystallized from cyclohexane. The propandiol-1,3-acetal of testosterone propionate thus obtained has a melting point of about 210° C., an optical rotation of about $(\alpha)^{20}_D = -41.4°$ in dioxane, and corresponds to the following structural formula:

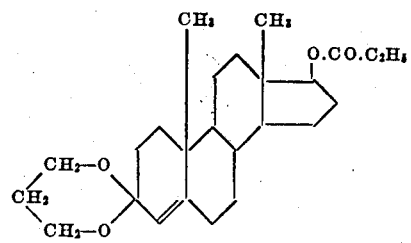

The action of 100 γ of this substance, injected intramuscularly into a capon, lasts for 22 days, whilst an equal amount of testosterone propionate shows effects lasting for 15 days only.

Example 7

A mixture of 5 gs. of pregneninol-17-on-20, 5 ccs. of propandiol-1,3, 20 mgs. of p-toluene sulfonic acid, and 250 ccs. of benzene are boiled under reflux for 24 hours, whereby the benzene flowing back to the reaction mixture passes a tube filled with calcium chloride in order to remove the water formed during reaction. Thereupon the solvent is evaporated in vacuo and the oily residue is dissolved in alcohol containing pyridine. A small amount of the starting material remains undissolved and is removed by filtration. The filtrate thus obtained is evaporated in vacuo to dryness and the residue dissolved in methanol containing pyridine. This solution is heated, carefully mixed with water, until it becomes cloudy, and allowed to stand with frequent scratching with a glass rod. Fine crystals are formed after some time. They are filtered off by suction and washed with dilute methanol. The crude yield amounts to 3.8 gs. After recrystallisation from dilute methanol the propandiol acetal of pregninolone forms fine needles of a melting point of about 153–161° C., the molten mass becoming clear at about 188° C.

On oral administration this substance is active in the test according to Allen-Corner on infantile rabbits treated with follicle hormone in a dose of 3.5–4 mgs.

The acetalisation may be carried out in any manner known per se, as described, for instance, in Jacobsohn and Stelzner "Lehrbuch der organischen Chemie," 2nd edition, vol. 1, p. 62 ff. (1923) or in Houben "Die methoden der organischen Chemie," 3rd edition, vol. 3 (1930), p. 191–197.

As catalysts there may be used in place of toluene sulfonic acid other organic sulfonic acids or mineral acids, glacial acetic acid, oxalic acid, acid salts, and the like.

Of course, many other changes and variations in the reaction conditions, the solvents used, temperature and duration of reaction, working up and purification of the reaction products, and the like may be made by those skilled in the art in accordance with the principles set forth herein and in the claims annexed hereto.

What we claim is:

1. A process for the manufacture of derivatives of ketosteroids comprising subjecting a ketosteroid to the action of an acetalizing agent of the group consisting of polyvalent alcohols and alkylene oxides to form a cyclic acetal of said ketosteroid.

2. A process for the manufacture of derivatives of ketosteroids comprising heating and reacting a ketosteroid with a polyvalent alcohol.

3. A process of making cyclic acetals from ketosteroids comprising reacting a ketosteroid with a polyvalent alcohol in the presence of a catalyst.

4. A process of making cyclic acetals from ketosteroids comprising reacting a ketosteroid with an alkylene oxide.

5. A process of making cyclic acetals from ketosteroids comprising reacting a ketosteroid with an alkylene oxide in the presence of a catalyst.

6. A process for the manufacture of derivatives of ketosteroids comprising reacting a ketosteroid of the androstan series in the presence of a catalyst with an acetalizing agent of the group consisting of polyvalent alcohols and alkylene oxides to form a cyclic acetal of said ketosteriod.

7. A process for the manufacture of derivatives of ketosteroids comprising reacting a ketosteroid of the pregnan series in the presence of a catalyst with an acetalizing agent of the group consisting of polyvalent alcohols and alkylene oxides to form a cyclic acetal of said ketosteriod.

8. A process for the manufacture of derivatives of ketosteroids comprising reacting androstendione-3.17 in the presence of a catalyst with an acetalizing agent of the group consisting of polyvalent alcohols and alkylene oxides to form a cyclic acetal of said ketosteroid.

9. A process for the manufacture of derivatives of ketosteroids comprising reacting pregneninolone in the presence of a catalyst with an acetalizing agent of the group consisting of polyvalent alcohols and alkylene oxides to form a cyclic acetal of said ketosteroid.

10. A process according to claim 3 wherein as catalyst p-toluene sulfonic acid is used.

11. A process according to claim 5 wherein as catalyst p-toluene sulfonic acid is used.

12. A process for the manufacture of derivatives of ketosteroids comprising reacting androstendione-3,17 in the presence of a catalyst with an acetalizing agent of the group consisting of polyvalent alcohols and alkylene oxides to form a cyclic acetal of said ketosteroid, and isolating the 3-monoacetal of androstendione-3,17.

13. The 3-ethylene ketal of androstendione-3,17 having a melting point of about 199° C. and an optical rotation of $(\alpha)^{20}{}_D = +26°$ in dioxane.

14. An acetal of a ketosteroid of the following formula

wherein X represents a steroid radical while R indicates a hydrocarbon radical.

15. An acetal of a ketosteroid of the following formula

wherein X represents a steroid radical while R indicates an aliphatic hydrocarbon radical.

16. An acetal of a ketosteroid of the following formula

wherein X represents a steroid radical while R indicates a —CH$_2$—CH$_2$— radical.

17. A ketosteroid compound having at least one

group attached to the steroid nucleus wherein R represents a hydrocarbon radical.

18. A 3-alkylene monoketal of androstendione corresponding to the following formula

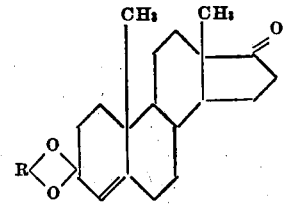

wherein R indicates an alkylene radical.

19. The 3-ethylene ketal of androstenol-17-one-3 having a melting point of about 181° C.

HEINRICH KÖSTER.
HANS HERLOFF INHOFFEN.